(12) United States Patent
Lee et al.

(10) Patent No.: US 7,139,375 B2
(45) Date of Patent: Nov. 21, 2006

(54) HIGHWAY EXPANSION APPARATUS FOR KEY TELEPHONE SYSTEM AND OPERATION METHOD THEREOF

(75) Inventors: Gab-Young Lee, Seoul (KR); Won-Young Lee, Seoul (KR)

(73) Assignee: LG-Nortel Co., Ltd., Seoul (KR)

( * ) Notice: Subject to any disclaimer, the term of this patent is extended or adjusted under 35 U.S.C. 154(b) by 625 days.

(21) Appl. No.: 10/325,837

(22) Filed: Dec. 23, 2002

(65) Prior Publication Data

US 2003/0118165 A1  Jun. 26, 2003

(30) Foreign Application Priority Data

Dec. 24, 2001 (KR) .................. 10-2001-0084511
Nov. 30, 2002 (KR) .................. 10-2002-0075682

(51) Int. Cl.
*H04M 1/00* (2006.01)
*H04M 7/00* (2006.01)

(52) U.S. Cl. .................. 379/156; 379/165; 379/171; 379/225

(58) Field of Classification Search ............... 379/156, 379/159, 165, 166, 167.01, 171, 172, 173, 379/182, 187, 225, 231, 232, 234
See application file for complete search history.

(56) References Cited

U.S. PATENT DOCUMENTS 4,135,063 A * 1/1979 Bosen .................. 379/159
4,292,475 A * 9/1981 Hill et al. .................. 379/172
5,204,861 A * 4/1993 Wiebe .................. 370/524
5,291,479 A * 3/1994 Vaziri et al. .................. 370/264
5,757,897 A * 5/1998 LaBarbera et al. .......... 379/165
5,778,058 A * 7/1998 Gavin .................. 379/225
5,859,903 A * 1/1999 Lee .................. 379/157
6,226,371 B1 * 5/2001 Brune .................. 379/165
6,263,061 B1 * 7/2001 Tanaka et al. .............. 379/156
6,661,883 B1 * 12/2003 Dowser et al. ............. 379/156

FOREIGN PATENT DOCUMENTS

| EP | 0040046 A1 | 11/1981 |
| EP | 0324058 A1 | 7/1989 |
| GB | 2152331 A | 7/1985 |
| GB | 2173673 A | 10/1986 |
| GB | 2183425 A | 6/1987 |

OTHER PUBLICATIONS

LG Electronics, Key Telephone System, www.lge.com/b_product/communication/e_kp/key_system/digital_sys.shtml, 3 pp.
LG Electronics, aria 300 Digital Business Telephone System, arewww.atlasgentech.co.nz/lg/300.php3, 3 pp.

* cited by examiner

*Primary Examiner*—Quoc Tran
(74) *Attorney, Agent, or Firm*—Fleshner & Kim, LLP

(57) ABSTRACT

In a highway expansion apparatus for a key telephone system and an operation method thereof, by connecting a MPB (main process board) of a master system with a system LMU (ink module unit) of an expansion system through a cable and generating a highway to be provided from the MPB to the expansion system, a highway of the key telephone system can be expanded.

17 Claims, 10 Drawing Sheets

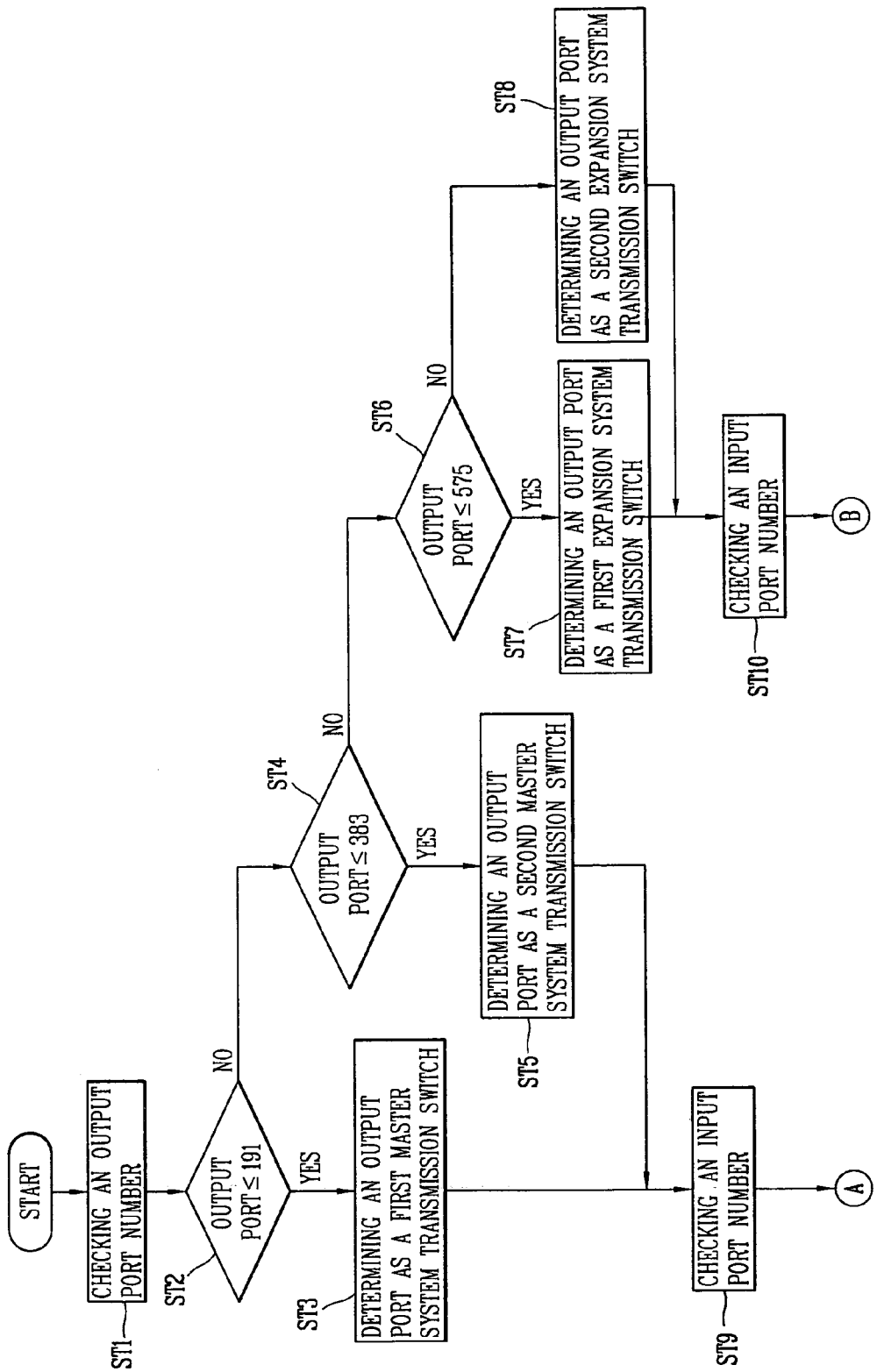

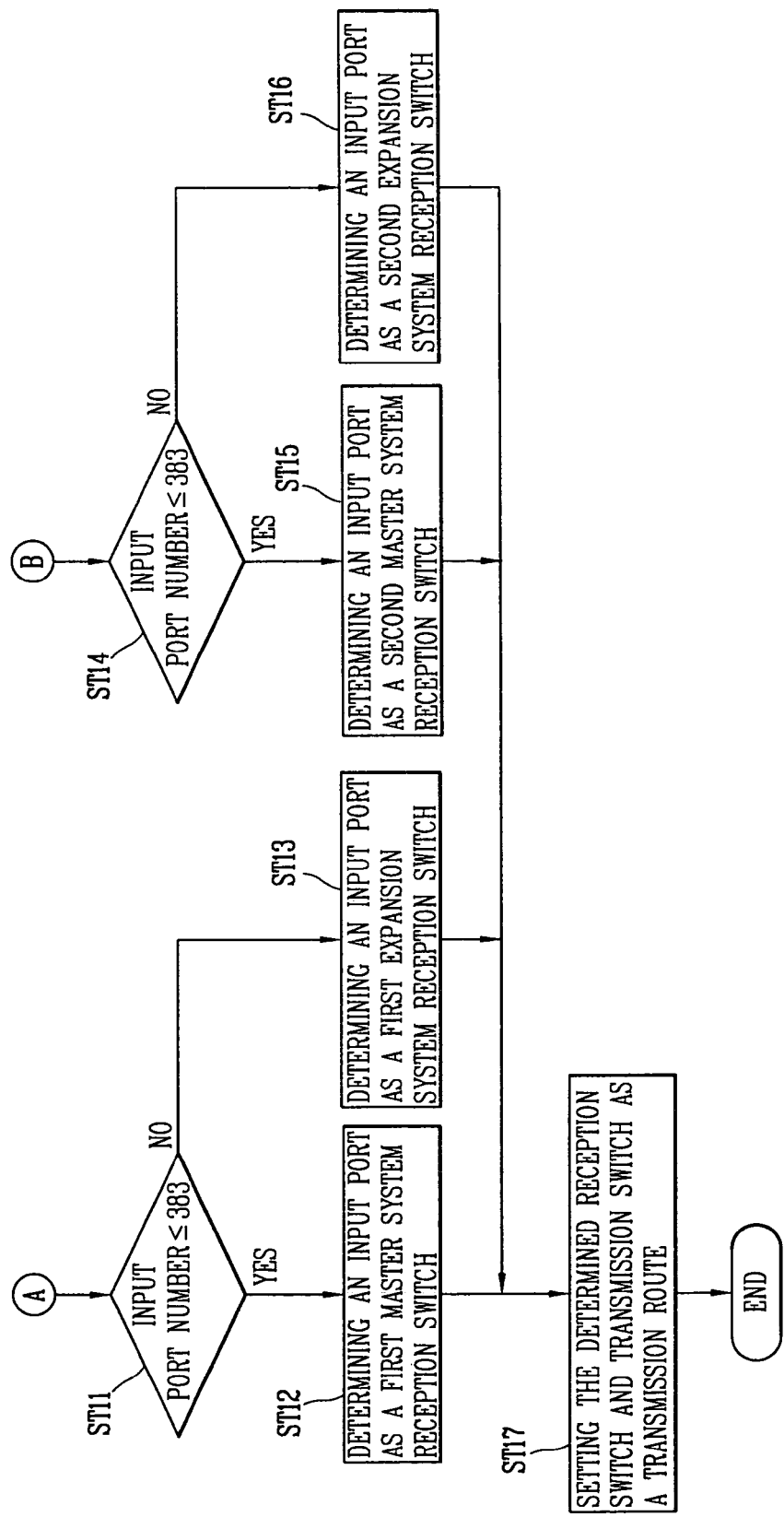

HIGHWAY EXPANSION APPARATUS FOR KEY TELEPHONE SYSTEM AND OPERATION METHOD THEREOF

BACKGROUND OF THE INVENTION

1. Field of the Invention

The present invention relates to a telephone system and in particular to a key telephone system.

2. Background of the Related Art

In general, a key telephone system is a small telephone exchange system for relaying telephone communication between extensions or between an extension and an outside phone by connecting plural telephones with extension numbers in order to use limited telephone lines by a great number of people. The key telephone system consists of a main device, telephone sets, lines connecting the main device with the telephone sets and an additional unit for operating the system more efficiently.

However, in the related unit key telephone system, the system can be limited to a maximum number of voice time slots provided through one switching unit, and it is not possible to expand voice channels to exceed the limited maximum number. In addition, in the related art key telephone system, a request for capacity expansion of the system cannot be satisfied.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a highway expansion apparatus for a key telephone system and an operation method thereof that expands a capacity of a system by connecting an expansion system to the key telephone system.

Another object of the present invention to provide a highway expansion apparatus for a key telephone system and an operation method thereof that satisfies a request for a system expansion using the key telephone system.

In order to achieve at least the above objects. in a whole or in part, a highway expansion apparatus for a key telephone system in accordance with the present invention includes a master system including a main process board (MPB), an expansion system including a system link module unit (LMU), and connection unit for connecting the MPB with the system LMU.

To further achieve the above objects in a whole or in part, an expansion apparatus for a key telephone system in accordance with the present invention includes an edge connects that connects to a main process board (MPB) slot of a master system, a control unit that controls operations of the key telephone system a switching unit having a plurality of switches to switch a pulse code modulation (PCM) voice signal plural tone generators each coupled to a corresponding one of the switches, respectively, to provide tones; and a system connector that connects to a system link module unit (LMU) of an expansion system.

To further achieve the above objects in a whole or in part, an operation method of a highway expansion apparatus for a key telephone system in accordance with the present invention includes determining a transmission switch by using an output port number of a highway, determining a reception switch by using an input port number of the highway, and transmitting the highway through a route of a selected reception and transmission switches.

To further achieve the above objects in a whole or in part, a method of operating a key telephone system in accordance with the present invention includes processing input signals by a master system reception switch and an expansion system reception switch, respectively, first-switching an output signal of the master system reception switch and an output signal of the expansion system reception switch and selectively transmitting the signals to each of a master system transmission switch and an expansion system transmission switch; and second-switching output signals of the master system transmission switch and the expansion system transmission switch.

To further achieve the above objects in a whole or in part, in an expansion apparatus for a key telephone system having a master unit and a slave unit, a method in accordance with the present invention includes judging a highway is outputted though a transmission switch of a master unit when an output port of the highway is one of a first prescribed range of values, judging a highway is outputted through a transmission switch of a slave unit when an output port of the highway is one of a second prescribed range of values greater than the first prescribed range, determining a reception switch according to an input port number and a transmission switch of the highway, and transmitting the highway through a connection route between a corresponding reception switch and a corresponding transmission switch, Additional advantages, objects, and features of the invention will be set forth in part in the description which follows and in part will become apparent to those having ordinary skill in the art upon examination of the following or may be learned from practice of the invention. The objects and advantages of the invention nay be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 9A and 9B are flow charts illustrating a preferred embodiment of a method of operating an expansion apparatus for a key telephone system in accordance with the present invention.

DETAILED DESCRIPTION OF PREFERRED EMBODIMENTS

Figure 1:
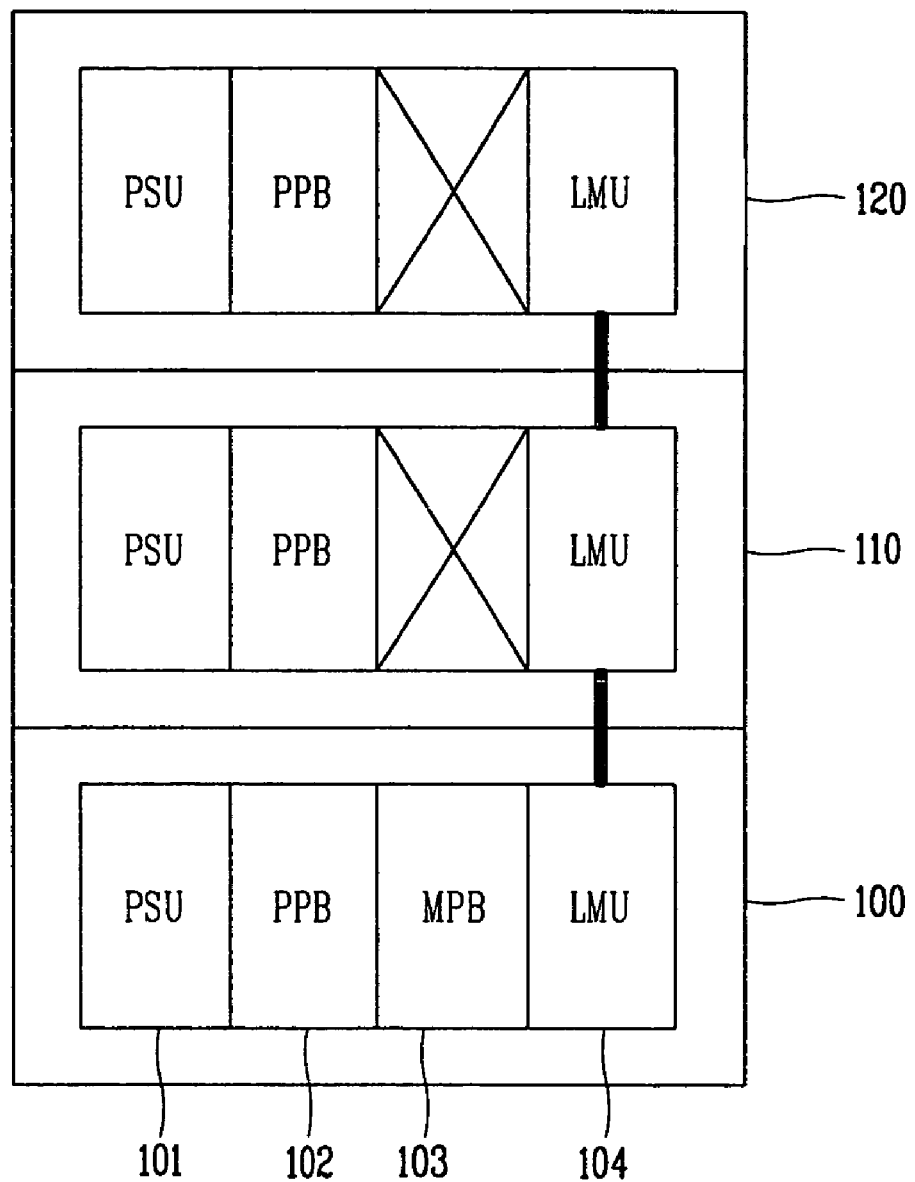
FIG. 1 is a block diagram illustrating a related art key telephone system.

FIG. 1 is a diagram that illustrates a main device of a related art key telephone system. As shown in FIG. 1, the main device includes a first key service unit 100 as a basic key service unit (KSU), a second key service unit 110 and a third key service unit 120 as expansion key service units.

The first key service unit 100 as the basic key service unit includes a power supply unit (PSU) 101 fox supplying system power plural peripheral board (PPBs) 102, and a main process board (MPB) 103 for generally controlling functions of the key telephone system. A link module unit (LMU) 104 is for interfacing with the second key service unit 110.

The second and third key service units 110, 120 bring the expansion key service units, respectively, include a PSU, a PPB and a LMU. In the second and third key service units 110, 120 a portion corresponding to the MPB 103 of the first key service unit 100 is blank. The first key service unit 100 and the second key service unit 110, the second key service unit 110 and the third key service unit 120 are connected with each other through each respective LMU for signal exchange.

Figure 2:
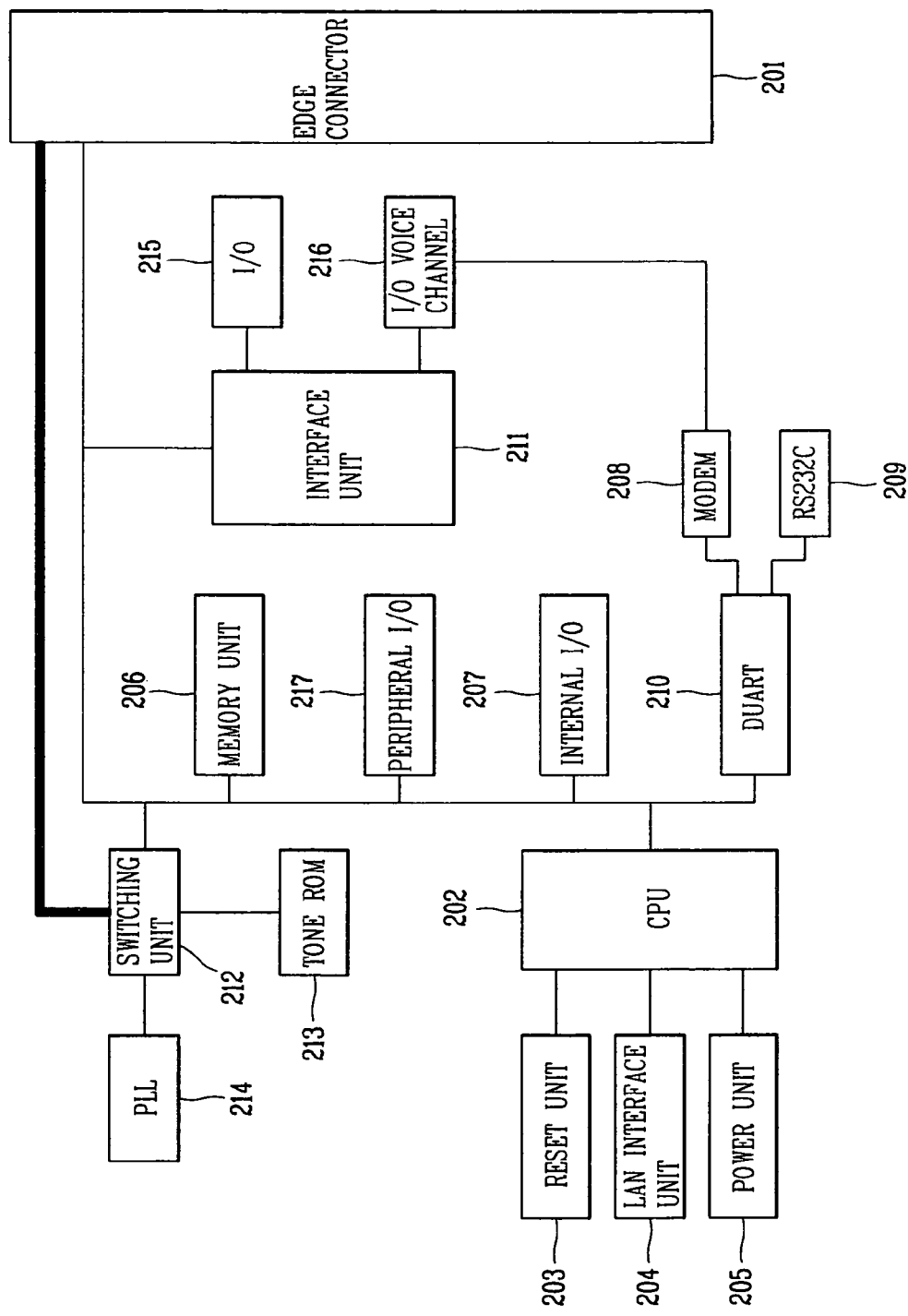
FIG. 2 is a block diagram illustrating a related art main process board.

FIG. 2 is a block diagram illustrating an internal construction of the related art MPB. As shown in FIG. 2, the MPB 103 includes an edge connector 201 for connecting the MPB 103 to a MPB slot of the first key service unit 100, a central processing unit (CPU) 202 for controlling general operation of the system and a reset unit 203 for resetting a CPU 202 and the system. A LAN interface unit 204 is for supporting connection with an Internet network, and a regulator 205 is for supplying power to the MPB 103. A memory unit 206 is for storing various data and programs necessary to the system. An internal I/O 207 is a general input/output port, and a dual universal asynchronous receiver/transmitter (DUART) 210 is for controlling interfaces with a serial communication equipment such as a modem 208 or a RS-232C 209. An interface unit 211 is for providing a pulse code modulation (PCM) voice signal to the MPB 103, a switching unit 212 is for switching a PCM voice signal and a tone read only memory (tone ROM) 213 is for providing various tones. A phase-locked loop (PLL) 214 is for providing a clock by synchronizing a phase of a time division multiple access (TDMA) PCM voice signal. The MPB 103 further includes an I/O 215 and a peripheral unit I/O 217 for providing input/output of plural peripheral units.

The memory unit 206 includes a programmable memory unit (PMU) and a static random access memory (SRAM), etc. In addition, the DUART 210 processes asynchronous serial communication by being connected to the modem 208 and the RS232C 209.

The operation of the key telephone system shown in FIG. 1 will now be described. In the power on state of the second and third key service units 110, 120, when the PSU 101 of the first key service unit 100 is on, the CPU 202 detects a connected peripheral unit and allocates a time slot for PCM voice signal to each PPB 102. The time slot for the voice signal determines a capacity of the system and has a highway structure.

Figure 3:
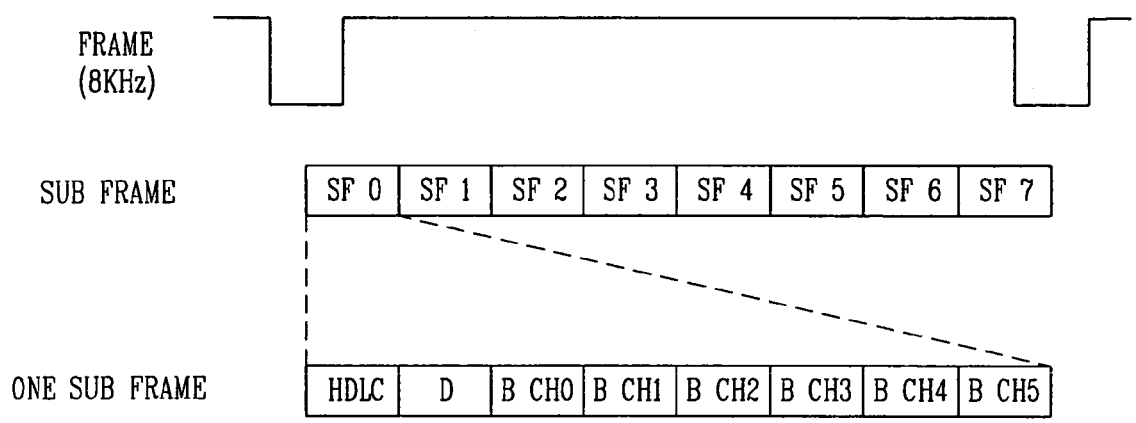
FIG. 3 illustrates a frame of a pulse code modulation highway.

FIG. 3 is a diagram that illustrates a frame of a PCM highway. As shown in FIG. 3, one frame has eight sub frames, and one sub frame is divided into eight channels. The sub frame has a high-level data link control (HDLC) channel of 512 Kbps, a D channel for transmitting a data signal and six voice channels of 64 Kbps each. Accordingly, one frame has 48 voice channels of 64 Kbps each. The 64 Kbps voice data experiences 8K-sampling and is sent along the highway, Accordingly, the switching unit 212 can process 384 voice channels, which is determined by the number of highways (e.g., 8) multiplied by the number of voice channels constructing one highway (e.g., 48). In the main device of the related art key telephone system shown in FIG. 1, three highways are respectively allocated to the first key service unit 100 and the second key service unit 110, and two highways are allocated to the third key service unit 120. Accordingly, a maximum 384 ports can be supported. However, the system does not allow expansion.

Figure 4:
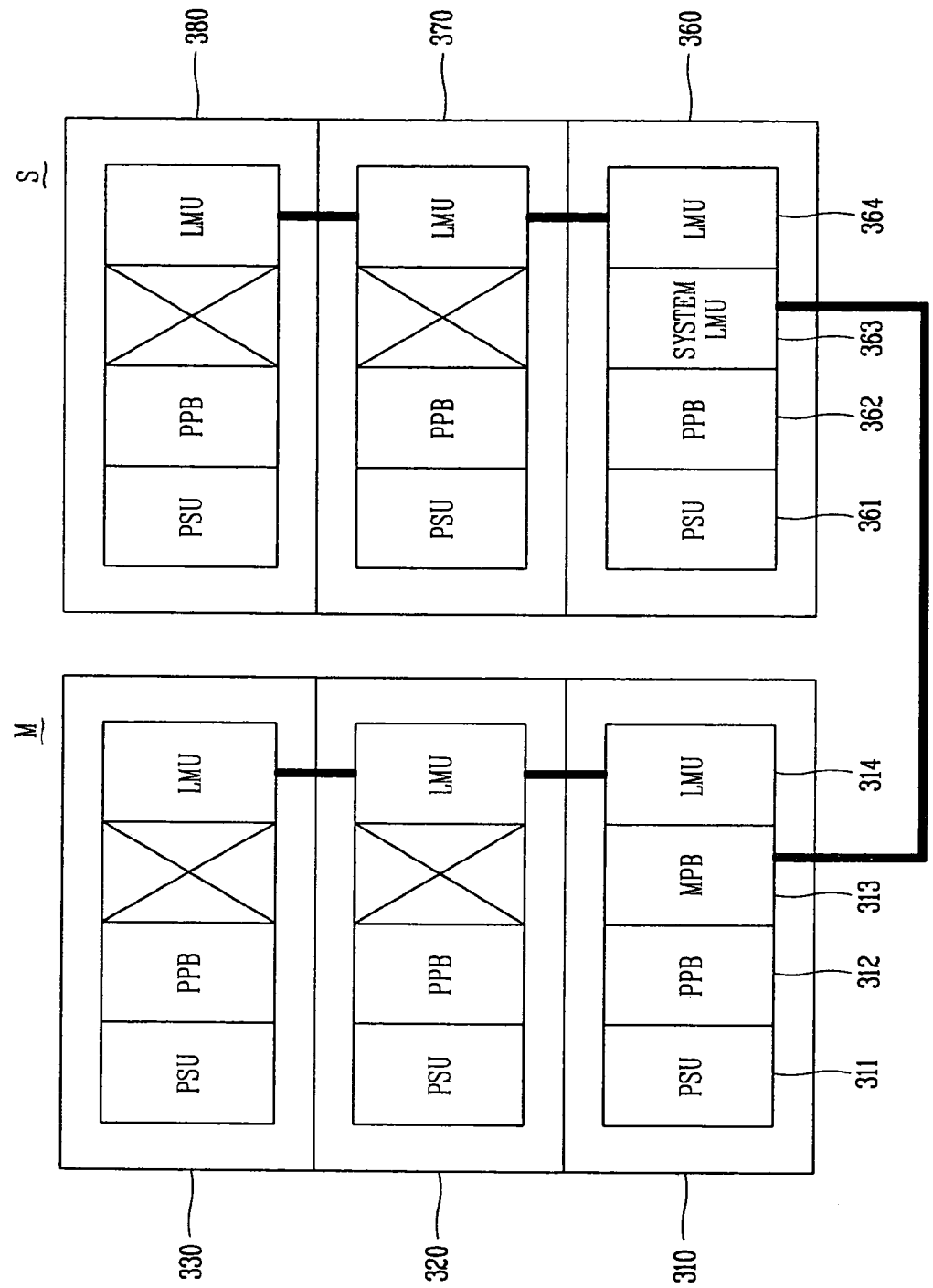
FIG. 4 is a block diagram illustrating a preferred embodiment of an expansion apparatus for a key telephone system in accordance with the present invention.

FIG. 4 is a block diagram illustrating a preferred embodiment of a expansion apparatus for a key telephone system in accordance with the present invention. The expansion apparatus can provide for highway expansion in a key telephone system. As shown in FIG. 4, the key telephone system can be divided into a master system M and an expansion system S. The master system M can include a first key service unit 310, a second key service unit 320 and a third key service unit 330. The expansion system S can include a fourth key service unit 360, a fifth key service unit 370 and a sixth key service unit 380.

The first key service unit 310 of the master system M preferably includes a power supply unit (PSU) 311 for supplying system power; plural peripheral boards (PPBs) 312; a main process board (MPB) 313 for controlling and monitoring functions of the key telephone system and a link module unit (LMU) 314 for interfacing with the second key service unit 320. The second and third key service units 320, 330 can have the same construction as the key telephone system of FIG. 1.

The fourth key service unit 360 of the expansion system S can include a PSU 361 for supplying power to the expansion system S, plural PPBs 362, a system LMU 363 preferably for setting connection between the MPB 313 of the master system M and the expansion system S and a LMU 364 for interfacing with other key service units of the expansion system S. The fifth and sixth key service units 370, 380 can have the same construction as the second and third key service units 320, 330.

The master system M and the expansion system S have different constructions. The MPB 313 can be installed in the master system M, the system LMU 363 can be installed in a main process board slot of the expansion system S instead of a MPB. The MPB 313 of the master system M and the system LMU 363 of the expansion system S can he coupled to each other through a cable, and the MPB 313 preferably controls the operation of the expansion system S through the system LMU 363.

Figure 5:
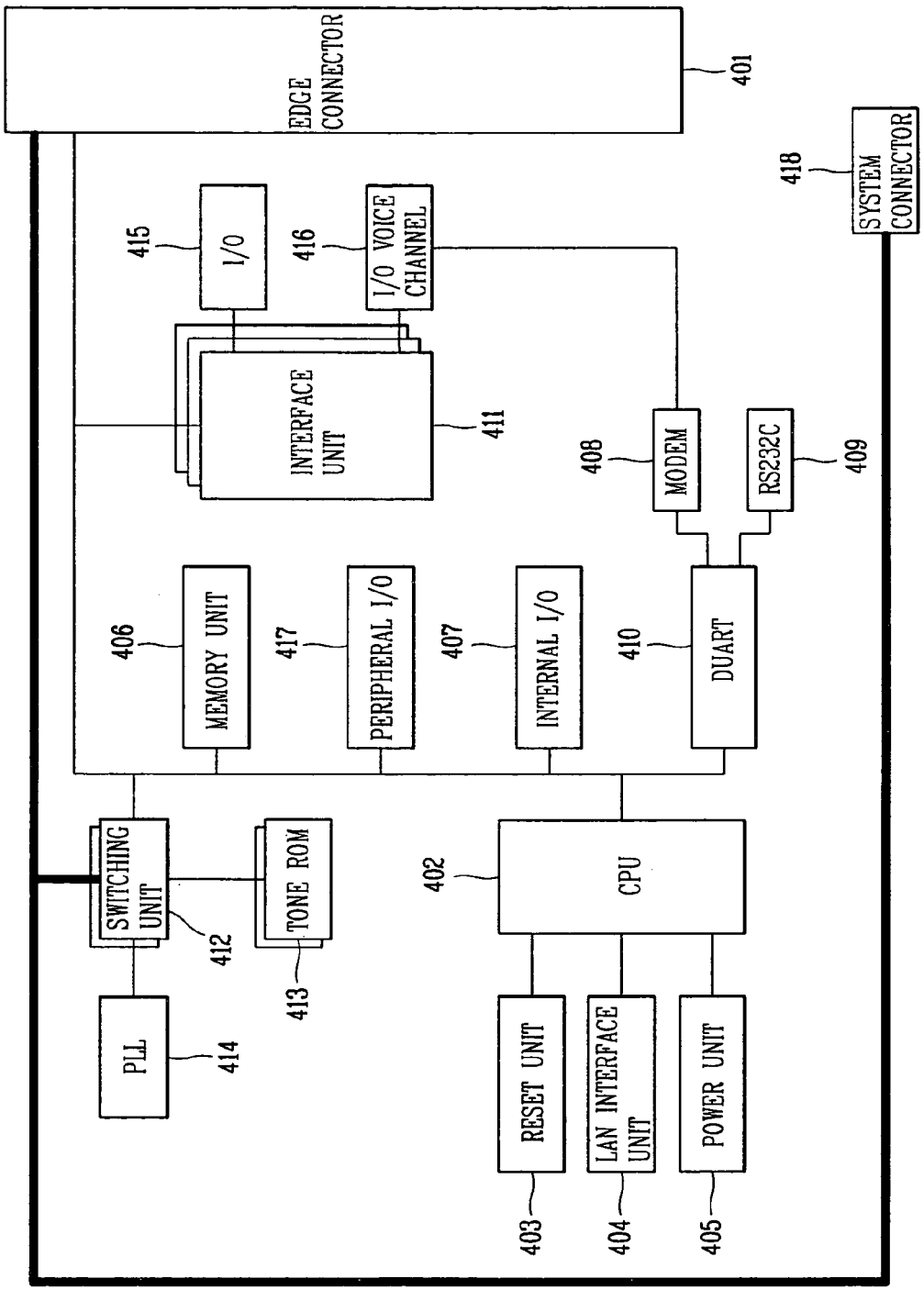
FIG. 5 is a block diagram illustrating a construction of an exemplary main process board of the key telephone system in accordance with the present invention.

FIG. 5 is a block diagram illustrating an exemplary construction of the MPB (main process board) of the key telephone system of FIG. 4. As shown in FIG. 5, the MPB 313 preferably includes an edge connector 401 for coupling the MPB 313 to a MPB slot of the first key service unit 310, a CPU 402 for controlling general operation of the system, a reset unit 403 for resetting the CPU 402 and the system, and a LAN interface unit 404 for supporting connection with an Internet network. A regulator 405 can supply power to the MPB 313, and a memory unit 406 can store various data and programs necessary to the system. An internal I/O 407 can provide a general input/output port, and a DUART 410 can control an interface with a serial communication equipment such as a modem 408 or a RS-232C 409.

An interface unit 411 preferably provides a PCM voice signal to the MPB 313, a switching unit 412 can include switches to perform switching of a PCM voice signal and a tone ROM 413 can provide various tones. A PLL 414 can provide a clock in order to synchronize a phase of a TDMA (time division multiple access) PCM voice signal. The MPB 313 can also include an I/O 415, an I/O voice channel 416, plural peripheral unit I/Os 417 for input/output for plural peripheral units and a system connector 418 for setting a connection between the MPB 313 with the system LMU 363 of the expansion system S preferably through a cable. Since the system connector 418 of the MPB 313 and the system LMU 363 of the expansion system S are coupled together through a cable, the MPB 313 can control the expansion system S.

The memory unit 406 can include a PMU (programmable memory unit) and a SRAM (static random access memory), etc. The interface unit 411 is preferably a digital backplane interface device, and it can be constructed as plural interface devices.

The switching unit 412 preferably includes plural switches. The switching, unit preferably includes four switches or eight switches. In addition, the switching unit 412 can be divided into a master unit for generating a highway signal to be transmitted to the master system M and a slave unit for generating a highway signal to be transmitted to the expansion system S. However, the present invention is not intended to be so limited. In case of eight switches, the switches can be divided into four master switches and four slave switches. The tone ROM 413 preferably corresponds to each switch and provides various tones to a pertinent switch. Accordingly, the number of switches and the number of tone ROMs can be the same. In more detail, when there are four switches in the switching unit 412, the number of tone ROMs are four, when there are eight switches in the switching unit 442, the number of tone ROMs are eight.

Figure 6:
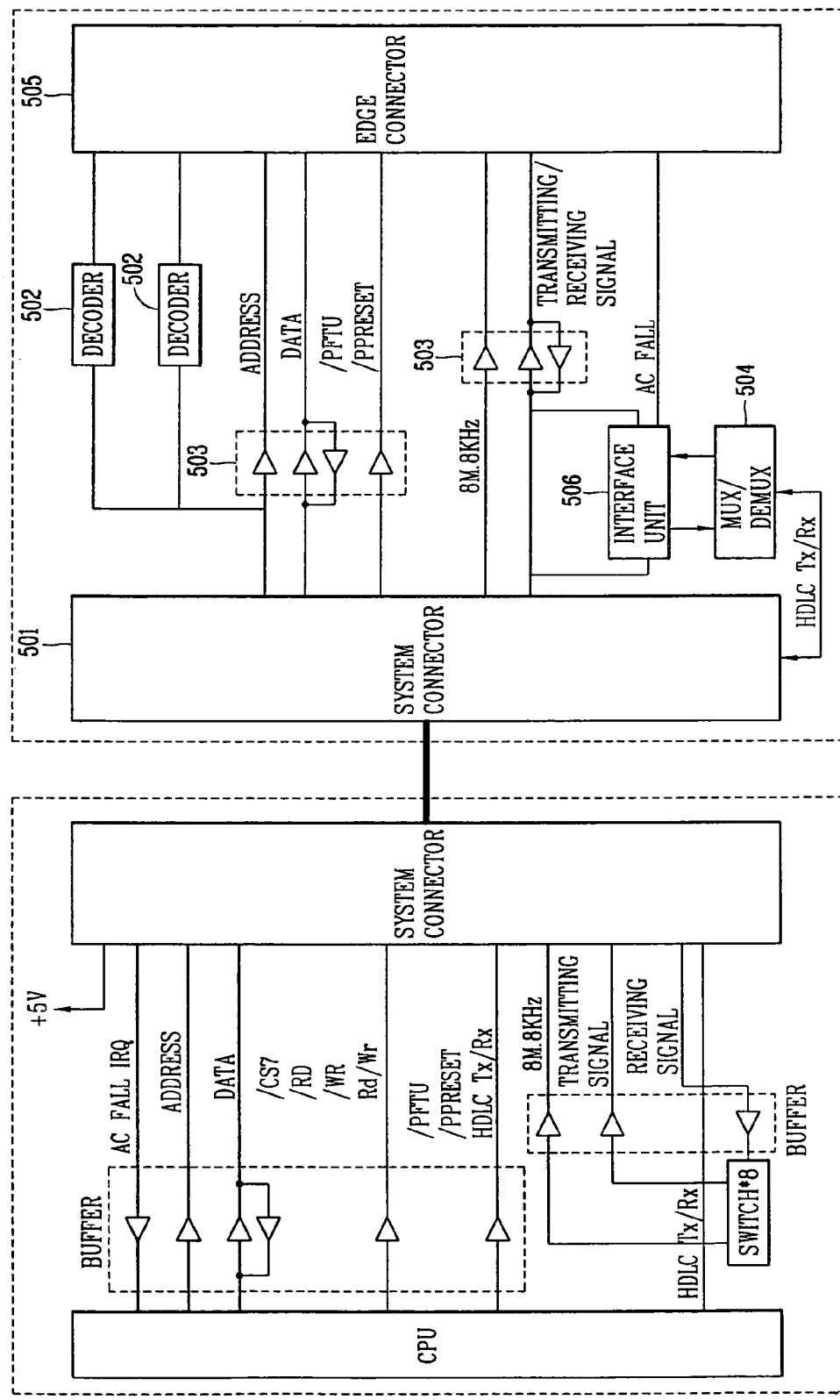
FIG. 6 is a block diagram illustrating an exemplary connection between the MPB of a master system and a system link module unit (LMU) of an expansion system in accordance with the present invention.

FIG. 6 is a block diagram illustrating an exemplary connection between the MPB of the master system and the system LMU of the expansion system in accordance with the present invention. As shown in FIG. 6, an interface between the master system M and the expansion system S will now be described.

The system LMU 363 of the expansion system S can include a system connector 501, a decoder 502, a buffer 503, a MUX/DeMUX 504, an edge connector 505 and an interface unit (DBID) 506. Preferably, the same signal with a signal of the MPB 313 of the maser system M is provided to the system LMU 363 of the expansion system S.

The system connector 501 can set a link between the MOB 313 of the master system M and the system LMU 363 of the expansion system S. The decoder 502 can generate a chip selection signal for accessing a non-intelligent peripheral (NIPP) board by assembling an address bus transmitted from the master system M and designating a specific address.

The buffer 503 is for preventing distortion of a signal transmitted from the master system M. The buffer 503 can prevent signal distortion of an address bus, a data bus and a control bus transmitted from the MPB 313 of the master system M.

The MUX/DeMUX 504 is for accessing an intelligent peripheral (IPP) board. The MUX/DeMUX 504 can control three key service units constructing the expansion system S by using a 512 Kbps high-level data link control (HDLC) signal transmitted from the CPU 402 of the MPB 313.

For example, when a high-level data link control signal transmitted from the CPU is '01' the MUX/DeMUX 504 can control the fifth key service unit 370 of the expansion system S. When a high-level data link control signal transmitted from the CPU is '10', the MUX/DeMUX 504 can control the sixth key service unit 380 of the expansion system S.

The edge connector 505 of the expansion system S is coupled to a mother board of the fourth key service unit 360, and the interface unit 506 provides a high-level data link control signal of the expansion system S and a basic voice signal.

Interface operations between the master system M and the expansion system S will now be described. A transfer signal outputted from the switch of the master system M is transmitted to the expansion system S through the buffer. The system LMU 363 of the expansion system S can receive an address bus, a data bus and a control bus transmitted from the MPB 313 of the master system M. The buffer 503 can reduce or prevent distortion of the received signal.

The decoder 502 assembles the received address bus and data bus in order to access a pertinent peripheral unit among coupled peripheral units by judging the assembled result and can transmit the transfer signal to the pertinent peripheral unit. The MUX/DeMUX 504 can control at least one of the three key service units of the expansion system S by using the HDLC signal transmitted from the MPB 313 of the master system M.

Figure 7:
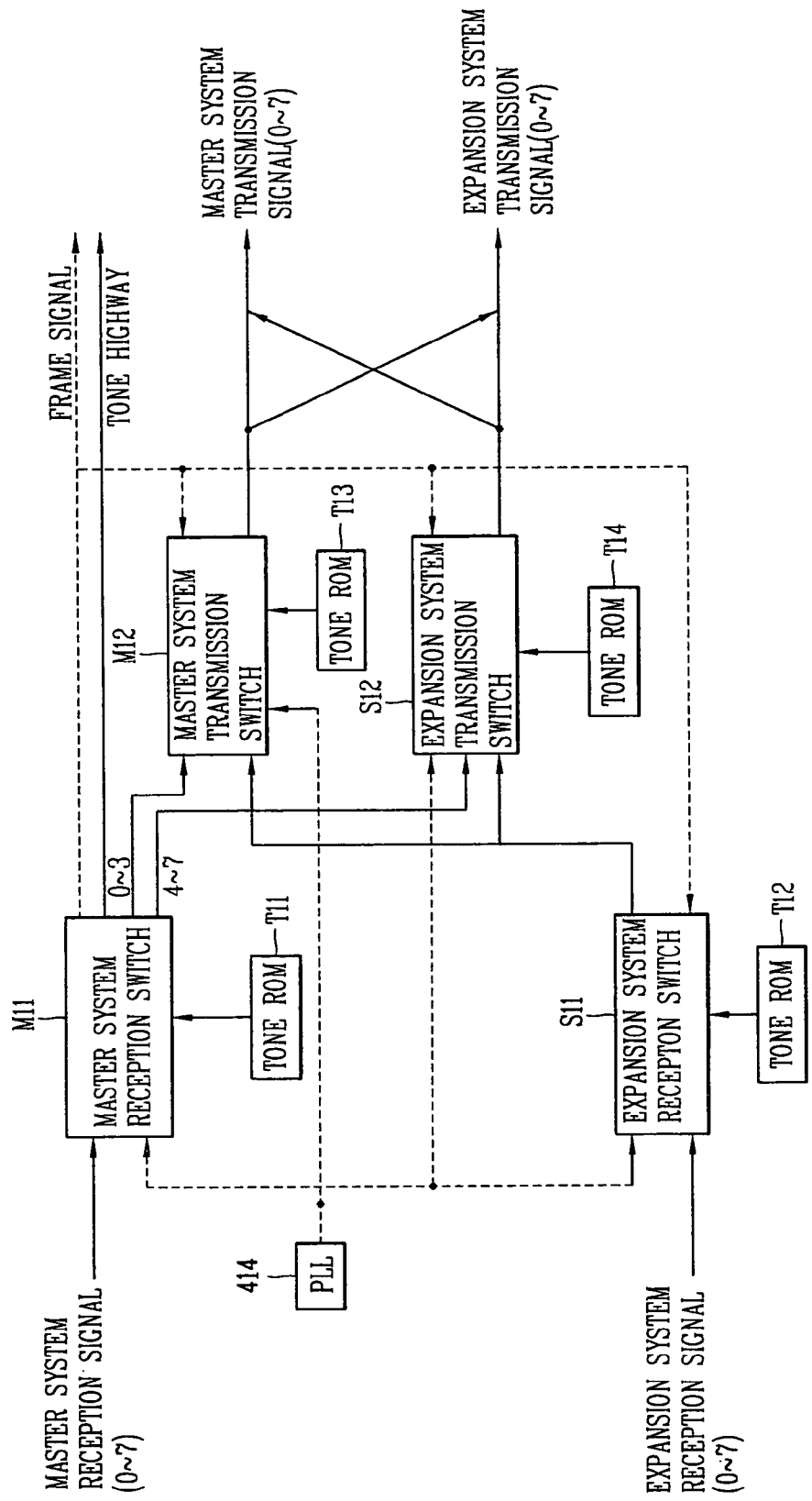
FIG. 7 is a block diagram illustrating a first preferred embodiment of a switching unit in accordance with the present invention.

FIG. 7 is a block diagram illustrating a first preferred embodiment of a switching unit and peripheral units thereof in accordance with the present invention. As shown in FIG. 7 the switching unit consists of four switches. However, the present invention is not intended to be so limited.

The switching unit 412 preferably includes a master system reception switch M11 for switching highway of the master system M, an expansion system reception switch S11 for switching highway of the expansion system S, a master system transmission switch M12 for transmitting the highway outputted from the master system reception switch M11 to the master system M; and an expansion system transmission switch S12 for transmitting the highway outputted from the expansion system reception switch S11 to the expansion system S. The switching unit 412 can also include the PLL 414 for providing a clock to synchronize each highway, and tone ROMs T11–T14 respectively coupled to the switches M11, S111, M12, S12 provide various tones.

Operations of the switching unit 412 that includes the four switches will be described. The master system reception switch M11 can generates a frame signal on the basis of 32.768 MHz transmitted from the PLF 414 and transmits it to the expansion system reception switch S11, the waster system transmission switch M12 and the expansion system transmission switch S12. By the frame signal, highways generated at the master system reception switch M11 the expansion system reception switch S11, the master system transmission switch M12 and the expansion system transmission switch S12 can be synchronized.

The master system reception switch M11 preferably processes a reception signal received from the master system M, and the expansion system reception switch S11 processes a reception signal received from the expansion system S. Each reception signal transmitted to the master system reception, switch M11 and the expansion system reception switch S11 can have eight highways.

Among the eight highways processed-outputted from the master system reception switch M11, four highways are preferably transmitted to the master system transmission switch M12, and the remaining four highways are transmitted to the expansion system transmission switch S12. In addition, among the eight highways processed-outputted from the expansion system reception switch S11, four highways can be transmitted to the master system transmission switch M12, and the remaining four highways can be transmitted to the expansion system transmission switch S12.

The master system transmission switch M12 can output eight highways by processing the four highways from the master system reception switch M11 and the four highways from the expansion system reception switch S11. In addition, the expansion system transmission switch S12 can output eight highways by processing the four highways from the master system reception switch M11 and the four highways from the expansion system reception switch S11. However, the present invention is not intended to be so limited as other combinations of highways can be used.

Preferably four highways of the eight highways from the master system transmission switch M12 and the four highways of the eight highways from the expansion system transmission switch S12 are implemented as eight highways and are transmitted to the master system M. The remaining highways from the master system transmission switch M12 and the remaining four highways from the expansion system transmission switch S12 are implemented as eight highways and are transmitted to the expansion system S.

In the switching unit 412 shown in FIG. 7 having four switches, because four master system highways and four expansion system highways are inputted to the master system transmission switch M12 and the expansion system transmission switch S12, respectively, when more than 192 ports are coupled between a reception switch and a transmission switch, excessive load may occur.

Figure 8:
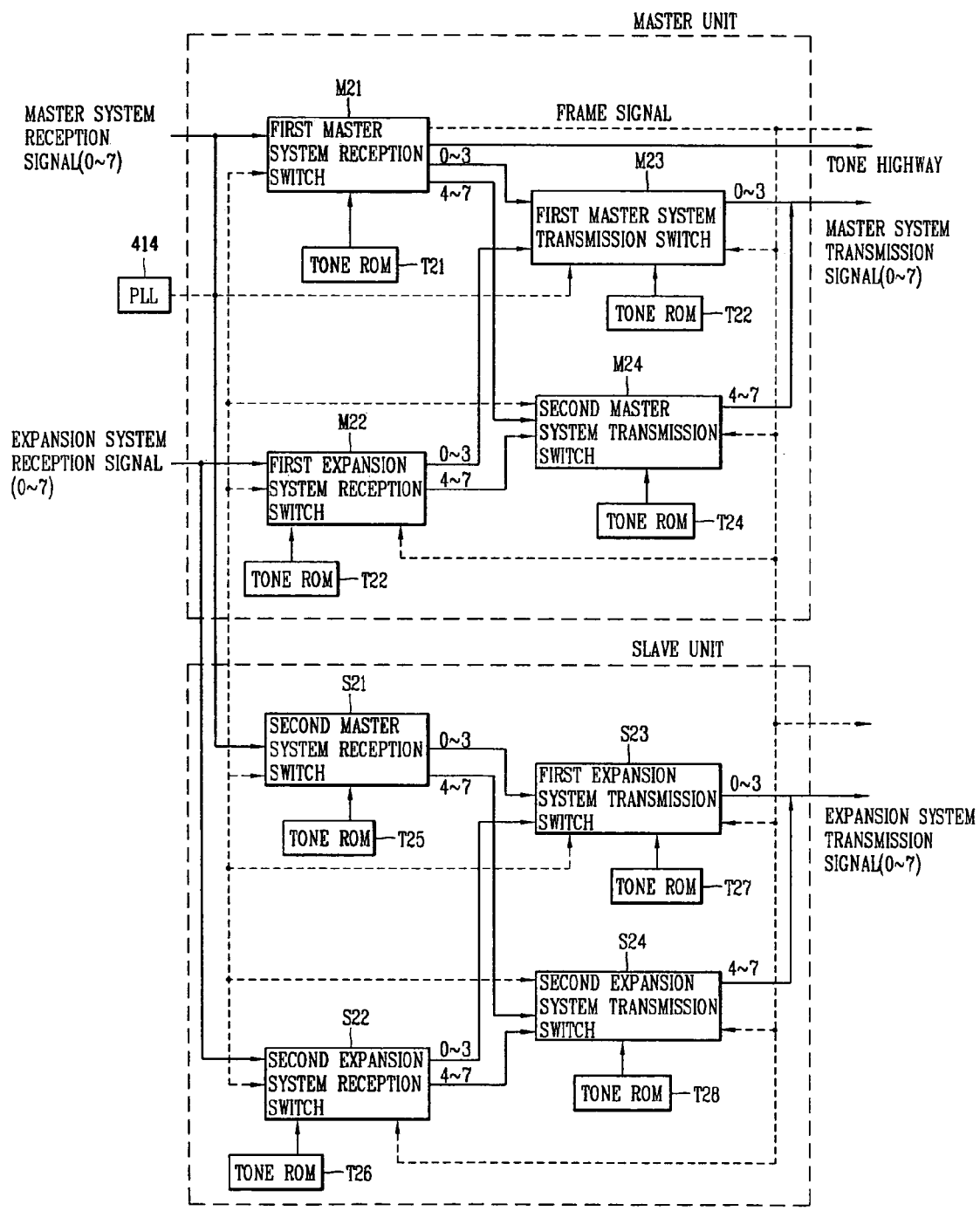
FIG. 8 is a block diagram illustrating a second preferred embodiment of a switching unit in accordance with the present invention.

FIG. 8 is a block diagram illustrating a construction of a second preferred embodiment of a switching unit and peripheral units in accordance with the present invention. As shown in FIG. 8, the switching unit 412 can have eight switches. In addition, the switching unit 412 can be divided into a master unit for generating a highway signal to be transmitted to the master system M and a slave unit for generating a highway signal to bc transmitted to the expansion system S.

The master unit can include a master system reception switch M21 for receiving highways of the master system M and an expansion system reception switch M22 for receiving highways of the expansion system S. A master system transmission switch M23 and a master system transmission switch M24 can generate highways to be transmitted to the master system M by selectively exchanging the highways from the first master system reception switch M21 and the highways from the first expansion system reception switch M22 with each other.

The slave unit can include a second master system reception switch S21 for receiving highways of the master system M and a second expansion system reception switch S22 for receiving highways of the expansion system S. First and second expansion system transmission switches S23, S24 can generate highways to be transmitted to the expansion system S by selectively exchanging the highways from the second master system reception switch S21 and the highways from the second expansion system reception switch S22 with each other.

In addition, the switching unit 412 of the slave unit can include the PLL 414 for providing a clock to each switch in order to synchronize highways generated in the eight switches, and tone ROMs T21–T28 can be respectively coupled to the switches and can provide various tones.

Operations of the switching unit 412 shown in FIG. 8 will now be described. The first master system reception switch M21 can receive a 32.768 MHz frame signal from the PLL 414 and output a frame signal (e.g. a 8.192 MHz frame signal). The output signal of the PLL 414 and the output signal of the first master system reception switch M21 are preferably transmitted to the second master system reception switch S21, the fist and second master system transmission switches M23, M24, the first and second expansion system reception switches M22, S22 and the first and second expansion system transmission switches S23, S24. By the frame signal, highways generated at the eight switches can be synchronized.

The first master system reception switch M21 and the second master system reception switch S21 preferably process reception signals from the master system M, and the first expansion system reception switch M22 and the second expansion system reception switch S22 preferably process reception signals from the expansion system S. Each reception signal can have eight highways.

Output signals of the first master system reception switch M21 and the first expansion system reception switch M22 can be transmitted to the first master system transmission switch M23 and the second master system transmission switch M24. Among eight highways outputted from the first master system reception switch M21, four are preferably transmitted to the fist master system transmission switch M23, and the remaining four are preferably transmitted to the second master system transmission switch M24. However, the present invention is not intended to be so limited as various asymmetric combinations could be transmitted as long as all highways preferably axe controllably passed to the transmission switches. Among eight highways outputted from the first expansion system reception switch M22, four are preferably transmitted to the first master system transmission switch M23, and the four are transmitted to the second master system transmission switch M24.

Output signals of the second master system reception switch S21 and the second expansion system reception switch S22 are preferably transmitted to the first expansion system transmission switch S23 and the second expansion system transmission switch S24. Among eight highways outputted from the second master system reception switch S21, four are preferably transmitted to the first expansion system transmission switch S23, and the remaining four preferably transmitted to the second expansion system transmission switch S24. In addition, among eight highways outputted from the second expansion system reception switch S22, four can be transmitted to the first expansion system transmission switch S23, and the remaining four can be transmitted to the second expansion system transmission switch S24.

The first master system transmission switch M23 and the second master system transmission switch M24 can process four highways from the first master system reception switch M21 and four highways from the first expansion system reception switch M22 and output four highways, respectively. The highways outputted from the first master system transmission switch M23 and the second master system transmission switch M24 are preferably added to each other, and accordingly eight highways can be transmitted output to the master system M.

The first expansion system transmission switch S23 and the second expansion system transmission switch S24 can process four highways from the second master system reception switch S21 and four highways from the second expansion system reception switch S22 and output four highways, respectively. The highways outputted from the first expansion system transmission switch S23 and the second expansion system transmission switch S24 are preferably added to each other, and accordingly eight highways can be output to the expansion system.

Signals outputted from the first and second master system transmission switches M23, M24 can be transmitted to a backplane of the master system M, and signals outputted from the first and second expansion system transmission switches S23, S24 can be transmitted to a backplane of the expansion system S.

The highways are divided into transmission highways and reception highways, and the switching unit 412 preferably supports nine transmission highways and eight reception highways. Since a tone highway is preferably included in the transmission highways, the number of transmission highways is greater than the number of reception highways by 1.

In the key telephone system in accordance with preferred embodiments of the present invention, it is possible to provide 384 ports supporting the expansion system S by connecting the expansion system S to the master system of FIG. 1 and using the eight switches. Accordingly, a total voice channel capacity is expanded from 384 ports to 768 (384×2=768) ports.

A method of operating the key telephone system in accordance with a preferred embodiment of the present invention will be described with reference to FIGS. 9A–9B. As shown in FIGS. 9A–9B, the operation method can be implemented and will be described using the second preferred embodiment of the expansion apparatus for the key telephone system of FIG. 8. However, the present invention is not intended to be so limited.

When a highway is inputted to the system, a prescribed internal algorithm designates a pertinent transmission switch by checking an output port number at which the highway is transmitted and determines a preferred or an ideal highway transmission route by checking an input port at which the highway is inputted. Thus, the prescribed algorithm can determine various combinations between the input port and the output port of the highway.

Each transmission switch supports 192 (4×48=192) ports because the four transmission switches output four highways, respectively. In the switching unit 412 of FIG. 8 having eight switches, the first master system transmission switch M23 can support a port number 0~191, the second master system transmission switch M24 can support a port number 192~383, the first expansion system transmission switch S23 support a port number 384~574, and the second expansion system transmission switch S24 can support a port number 576~767.

The system preferably checks an output port number of a highway through the prescribed internal algorithm as shown at ST1. When the value (e.g. output port number) is less than 191, it is judged the highway is preferably outputted to the master system M through the first master system transmission switch M23 as shown at steps ST2 and ST3. When the value (e.g. output port number) is not less than 191 and less than 383, it is judged the highway is preferably outputted to the master system M through the second master system transmission switch M24 as shown at steps ST4 and ST5. When the value (e.g. output port number) is not less than 383 and less than 575, it is judged the highway is preferably outputted to the expansion system S through the first expansion system transmission switch S23 as shown at steps ST6 and ST7. When the value (e.g. output port number) is greater than 576, it is judged that highway is preferably outputted to the expansion system S through the second expansion system transmission switch S24 as shown at steps ST8.

After determining the output port, an input port number of the highway can be checked as shown at steps ST9 and ST10. The input port number can be determined according to a second prescribed algorithm.

When an input port number of the highway having the first M23 or second master system transmission switch M24 as the output port is less than 383, it can be judged the highway is inputted through the first master system reception switch (e.g., M21) as shown at steps ST11 and ST12. When preferred or a input port number of the highway having the first M23 or second master system transmission switch M24 as the output port is not less than 383, it can be judged the highway is inputted through the first expansion system reception switch (e.g., M22) as shown at step ST13. When an input port number of the highway, which has the first S23 or second expansion system transmission switch S24 as the output port, is less than 383, it can be judged the highway is inputted through the second master system reception switch, (e.g., S21) as shown at steps ST14 and ST15. When an input port number of the highway having the first S23 or second expansion system transmission switch S24 as the output port is not less than 383, it can be judged the highway is inputted through the second expansion system reception switch (e.g. S22) as shown at step ST16.

When a preferred or ideal transmission route of the highway is set, the signal is inputted through a pertinent switch among the first and second master system reception switches, the first and second expansion system reception switches, and the signal is outputted to the master system M or the expansion system S through the determined transmission switch as shown at ST17.

For example, if there is a signal having an input port value as 187 and an output port as 512, the signal is inputted through the second master system reception switch and is outputted through the first expansion system transmission switch. If there is a signal having an input port value as 452 and an output port as 87, the signal is inputted through the first expansion system reception switch and is outputted through the first master system transmission switch As described above, using preferred embodiments of a highway expansion apparatus for the key telephone system and operation methods thereof in accordance with the present invention, it is possible to connect an expansion system to at master system. Further, a voice channel capacity of a key telephone system can be expanded, for example, from 384 voice channels to 768 voice channels. In addition, in preferred embodiments of a highway expansion apparatus for a key telephone system and methods of operating the same in accordance with the present invention, by expanding a capacity of a system by using an expansion system having the same structure with the existing key telephone system, it is possible to expand a capacity of the existing system. Further, by setting a route corresponding to an input port and an output port of a highway can be set using a plurality of switches and by using eight switches, it is possible to prevent excessive load in accordance with the preferred embodiments.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A key telephone system capable of highway expansion, compnsrng:
 a master system including a main process board (MPB), the master system being controlled by the MPB and having a first number of highways, the first number of highways determining a voice channel capacity of the master system;
 an expansion system including a system link module unit (LMU), the expansion system having a second number of highways; and
 connection means for connecting the MPB with the system LMU, the MPB controlling the expansion system through the system LMU, the expansion system being controllable by the MPB to increase the capacity of the master system.

2. The system of claim 1, wherein the MPB comprises:
 an edge connector configured to couple the MPB to a board slot;
 a control unit configured to control operations of the master system;
 a power unit configured to supply power to the MPB;
 an interface unit configured to provide a pulse code modulation (PCM) voice signal;
 a switching unit having plural switches and configured to switch PCM voice signals; and
 a system connector configured to set connection between the MPB and the system LMU of the expansion system.

3. The system of claim 1, wherein the system LMU of the expansion system is installed at a position corresponding to a MPB slot of the master system.

4. The system of claim 1, wherein the system LMU comprises:
 a system connector configured to provide a connection between the expansion system and the MPB of the master system;
 a decoder configured to generate a chip selection signal for accessing plural peripheral units by using an address bus transmitted from the master system;
 an interface unit configured to transmit a high-level data link control (HDLC) signal and a voice signal of the expansion system; and
 a selection unit configured to support a key service unit of the expansion system through the HDLC signal transmitted from the MPB.

5. An apparatus for controlling highway expansion of a key telephone system, comprising:
 an edge connector that connects to a main process board slot of a master system;
 a control unit that controls operations of the key telephone system;
 a switching unit having a plurality of switches to switch a pulse code modulation (PCM) voice signal;
 plural tone generators each coupled to a corresponding one of the switches, respectively, to provide tones; and
 a system connector that connects to a system link module unit (LMU) of an expansion system,
 wherein the control apparatus controls the expansion system to expand a number of highways of the key telephone system.

6. The apparatus of claim 5, wherein the switching unit consists of four switches.

7. The apparatus of claim 6, wherein the four switches further comprise:
 a master system reception switch that receives a voice signal of the master system;
 an expansion system reception switch that receives a voice signal of the expansion system;
 a master system transmission switch that transmits first output signals of the master system reception switch and the expansion system reception switch to the master system; and
 an expansion system transmission switch that transmits second output signals of the master system reception switch and the expansion system reception switch to the expansion system.

8. The apparatus of claim 5, wherein the switching unit comprises eight switches.

9. The apparatus of claim 8, wherein the switching unit comprises:
 a master unit that outputs inputted voice signals to the master system; and
 a slave unit that outputs the inputted voice signals to the expansion system.

10. The apparatus of claim 9, wherein the master unit comprises:
 a first master system reception switch that receives a voice signal of the master system;
 a first expansion system reception switch that receives a voice signal of the expansion system; and
 a first and second master system transmission switches that respectively transmit output signals of the first master system reception switch and the first expansion system reception switch.

11. The apparatus of claim 9, wherein the slave unit comprises:
 a second master system reception switch that receives the voice signal of the master system;
 a second expansion system reception switch that receives the voice signal of the expansion system; and
 a first and a second expansion system transmission switches that respectively transmit output signals of the second master system reception switch and the second expansion system reception switch.

12. The apparatus of claim 5, wherein the system LMU of the expansion system is installed at a position corresponding to a main process board (MPB) slot of the master system.

13. The apparatus of claim 5, wherein the system LMU comprises:
 a system connector that provides a connection between the expansion system and the MPB of the master system;
 a decoder that generates a selection signal for accessing plural peripheral units by using a control signal from the master system;
 an interface unit that transmits a high-level data link control (HDLC) signal and a voice signal of the expansion system; and
 a selector that supports a key service unit of the expansion system through the HDLC signal transmitted from the MPB.

14. An operation method of a highway expansion apparatus for a key telephone system, comprising:
 selecting a transmission switch by using an output port number of a highway, the transmission switch comprising at least one master system transmission switch operatively connected to a master system of the expansion apparatus and at least one expansion system transmission switch operatively connected to an expansion system of the expansion apparatus;

selecting a reception switch by using an input port number of the highway, the reception switch comprising at least one master system reception switch for receiving a highway of the master system and at least one expansion system reception switch for receiving a highway of the expansion system; and transmitting the highway through a route of the selected reception and transmission, wherein the master system transmission switch outputs an output signal of the reception switch to the master system and the expansion system transmission switch outputs an output signal of the reception switch to the expansion system, and wherein the expansion system is controllable to expand a number of highways of the key telephone system by increasing the capacity of the master system.

15. The method of 14, wherein the route comprises a selected one among a plurality of reception switches and a selected one among a plurality of transition switches according to prescribed criteria.

16. In an expansion apparatus for a key telephone system having a master unit and a slave unit, a method, comprising:

judging a highway is outputted through a transmission switch of a master unit when an output port of the highway is one of a first prescribed range of values;

judging a highway is outputted through a transmission switch of a slave unit when an output port of the highway is one of a second prescribed range of values greater than the first prescribed range;

determining a reception switch according to an input port number and a transmission switch of the highway outputted; and transmitting the highway through a connection route between a corresponding reception switch and a corresponding transmission, wherein the slave unit is controllable to expand a number of highways of the key telephone system by increasing the capacity of the master unit.

17. The method of claim 16, wherein the determining a reception switch comprises:

determining the reception switch of a highway as first master system reception switch when the highway has an input port number within the first prescribed range and has an output switch as the master unit transmission switch;

determining a reception switch of a highway as first expansion system reception switch when the highway has an input port number within the second prescribed range and has an output switch as the master unit transmission switch;

determining a reception switch of a highway as a second master system reception switch when the highway has an input port number within the first prescribed range and has an output switch as a slave unit transmission switch; and determining a reception switch of a highway as a second expansion system reception switch when the highway has an input port number within the second prescribed range and has an output switch as the slave unit transmission switch.

* * * * *